Aug. 1, 1933.　　　　R. G. PALMER　　　　1,920,663

VEHICLE FOR COLLECTING CONTAINERS

Filed Nov. 28, 1930　　　2 Sheets-Sheet 1

Inventor,
Raymond Guy Palmer

Per: George E. Folke.
Attorney.

Aug. 1, 1933.　　　　　R. G. PALMER　　　　　1,920,663
VEHICLE FOR COLLECTING CONTAINERS
Filed Nov. 28, 1930　　　2 Sheets-Sheet 2

Inventor,
Raymond Guy Palmer
By:- George E. Folkes.
Attorney.

Patented Aug. 1, 1933

1,920,663

UNITED STATES PATENT OFFICE 1,920,663

VEHICLE FOR COLLECTING CONTAINERS

Raymond Guy Palmer, Sherbourne Hill, Warwick, England

Application November 28, 1930, Serial No. 498,692, and in Great Britain January 6, 1930

3 Claims. (Cl. 211—146)

This invention has reference to improvements in or relating to vehicles for collecting containers and is concerned more particularly with vehicles for collecting containers such as dust bins, barrels, drums and the like, the present invention having for its object the provision of a vehicle for collecting containers of the said kind which permits of the carriage on the vehicle of a relatively large number of containers without entailing an undue increase in the dimensions of the vehicle and which enables the unloading and loading of the containers to be effected with the utmost despatch and with the minimum of inconvenience and danger to those effecting the said operations.

The invention consists of an improved vehicle for collecting containers and is characterized by a plurality of reception members or means for the containers which are capable of being brought successively into a loading and unloading position when required and of being moved into an out of the way position when loading or unloading has been effected to permit of dealing with succeeding reception members or means.

The invention further resides in the provision of devices for locking the reception members or means so as to prevent swinging during unloading and loading and when the vehicle is in motion.

The invention still further resides in the details of construction of the improved vehicle for collecting and carrying dust bins to be described hereinafter.

The invention will now be described with particular reference to the accompanying sheets of drawings wherein:—

Figure 1:
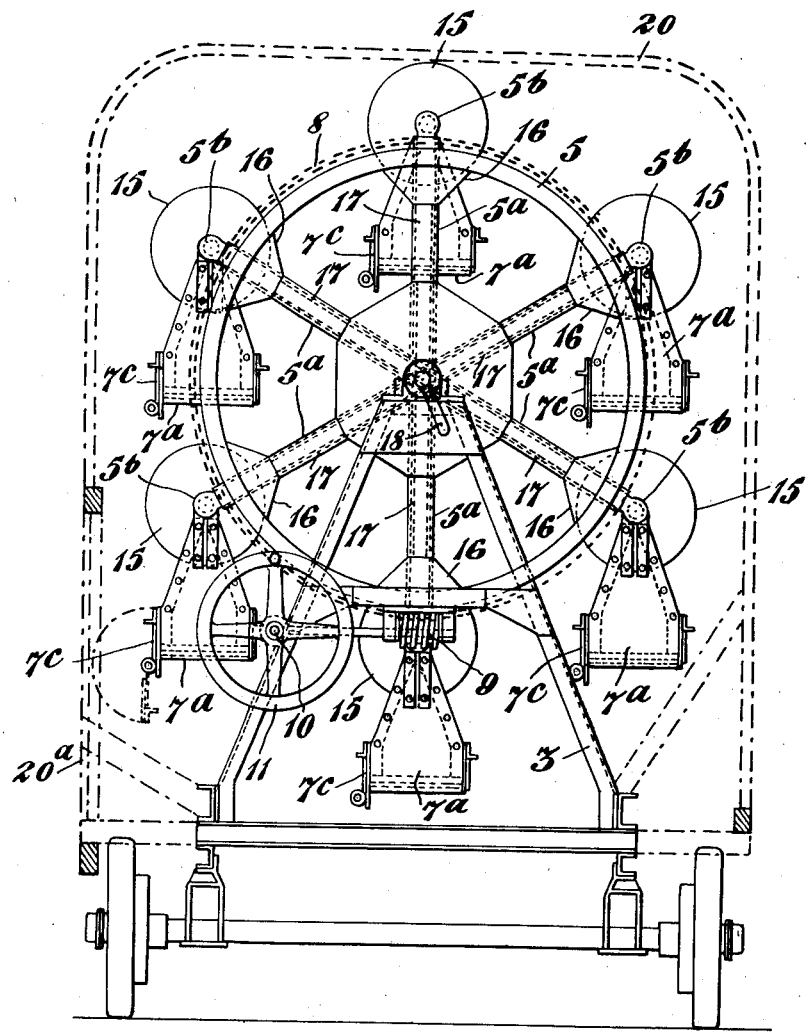
Figure 1 is a rear end view illustrating the invention as applied to a trailer vehicle of known construction.
Figure 2:
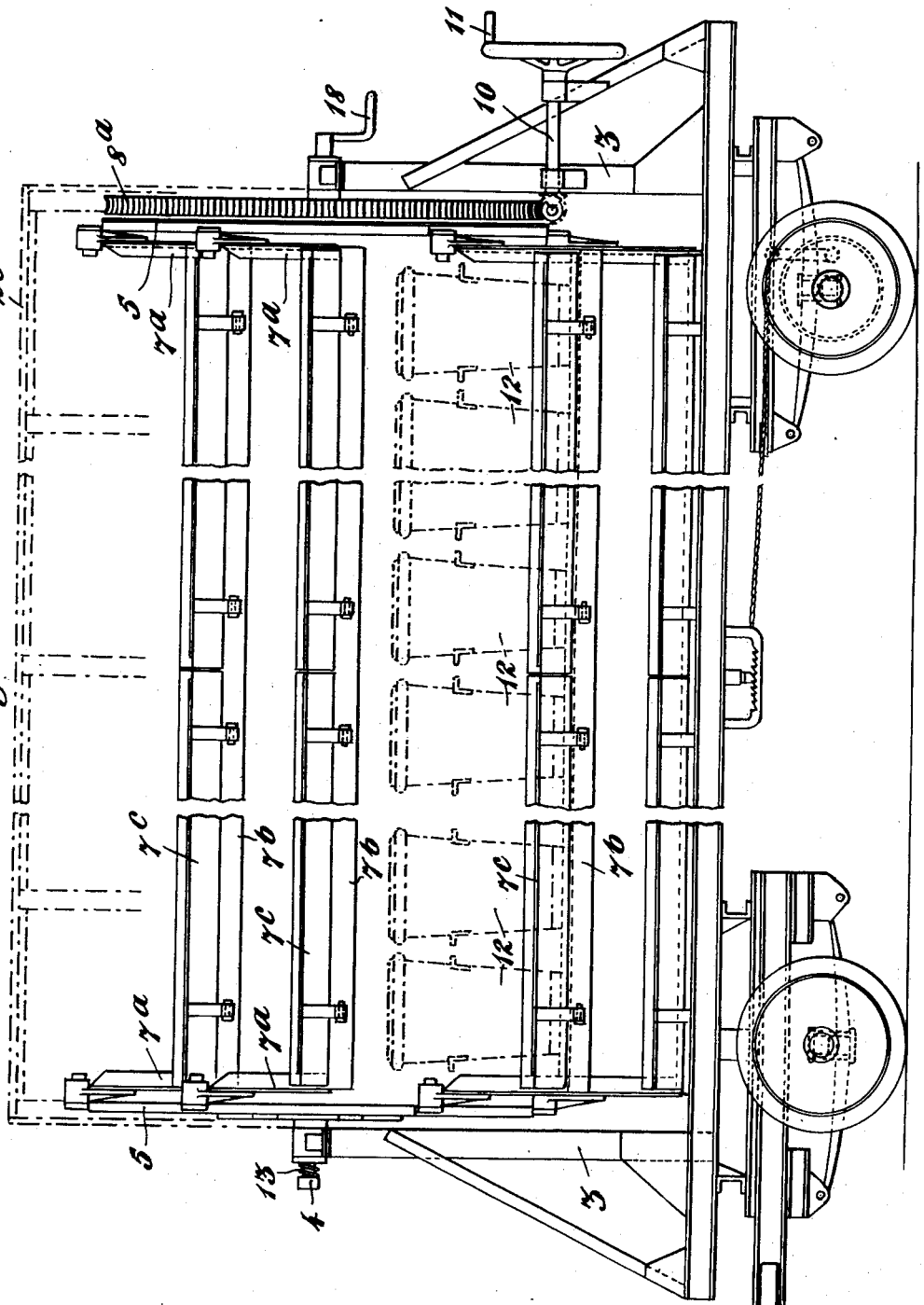
Figure 2 is a side view of the vehicle illustrated in Figure 1 parts of the vehicle being broken away, where desirable, for the purposes of clearness.

The trailer vehicle illustrated in the drawings is of the known "Eagle" type and has mounted on the frame of the vehicle adjacent to the ends standards 3 of a substantially triangular shape. These standards support at their upper ends bearings within which are rotatably mounted the end portions of a longitudinally disposed axle 4 which has secured therein adjacent to its ends wheel members 5. The wheel members 5 are provided with radially disposed spokes 5$^a$ having extensions 5$^b$ which carry inwardly projecting spindles from which are pivotally suspended longitudinally disposed trays consisting of end members 7$^a$ connected by a longitudinal section 7$^b$ of a substantially trough-shape in cross-section. The rear end of the axle 4 carries a worm wheel 8 which meshes with a worm 9 adapted to be driven from a spindle 10 actuated by a hand wheel 11.

The trough sections of each tray are provided with wedge shaped rubber lined blocks (not shown) adapted to receive the bases of a plurality of dust bins 12.

The front ends of the horizontal sections 7$^b$ of the trays are closed by hinged flaps 7$^c$ which facilitate the loading and unloading of the trays.

The rear end members 7$^a$ of the trays are provided with discs 15 the peripheries whereof are formed of a friction material such as "Ferodo" and which discs 15 co-operate with brake shoes 16 carried by rods 17 slidably mounted on or in the spokes 5$^a$ of the wheel members 5. These rods 17 and brake shoes 16 carried thereby are adapted to be moved simultaneously into or out of contact with the discs as required, and for a purpose to be described hereinafter, by means of a cam (not shown) actuated by a crank handle 18 at the rearward end of the vehicle.

The whole of the parts described are preferably enclosed by a hood or cover 20 provided on the "near" side of the vehicle with an opening at the lower end thereof for permitting access to be gained to the trays said opening being capable of being closed by a hinged door 20$^a$.

The operation of the invention is as follows:— The trays are loaded with empty dust bins 12 by rotating the wheel members 5 by means of the worm and worm wheel gearing so as to bring the trays successively to the loading position which is the position most convenient of access from the door 20$^a$ and when the vehicle has arrived at the place at which it is desired to discharge the empty dust bins and to collect full dust bins the trays are brought successively to the loading and unloading position when the empty dust bins are removed and replaced by filled dust bins. During loading and unloading the trays are prevented from swinging by operating the handle 18 so as to move the brake shoes 16 into contact with the brake discs 15.

The brake shoes 16 are also engaged with the aforesaid brake discs 15 when the vehicle is in motion.

It will be appreciated that by freely suspending the trays from the wheel members 5 the trays hang vertically in all positions and, furthermore, that by mounting the trays on rotary members a constant loading and unloading position may be obtained which obviates the necessity of working from both sides of the vehicle thereby rendering the use of the vehicle safer for those effecting loading and unloading as there is no necessity to work on the "offside" of the vehicle. Moreover, the provision of rotary reception means for the containers permits of a relatively large number of containers being dealt with without involving any undue increase in the overall dimensions of the vehicle.

What I claim is:—

1. A vehicle for collecting containers embodying standards supported from the vehicle at each end thereof, wheel members supported from and rotatably mounted relatively to said standards, a plurality of trays pivotally suspended form the wheel members at equi-distantly spaced intervals so that the trays tend to remain in a vertical position under the action of gravity, said trays each being adapted to receive a number of containers, means for bringing the trays successively into a loading and unloading position, a braking means in conjunction with each tray for restraining the pivotal movement of the trays and thus preventing their swinging relatively to the wheel members while loading and unloading and when the vehicle is in transit, and a common actuating member for effecting the simultaneous operation of the braking means when required.

2. A vehicle for collecting containers embodying supporting means carried by the vehicle at each end thereof, a frame supported from said standards and rotatably mounted relatively thereto, reception means pivotally suspended from said frame, means for rotating the frame so as to bring the reception means successively into a loading and unloading position, friction discs carried by each of the reception means, brake shoes adapted to co-operate with each of said friction discs for preventing swinging of the reception means relatively to the frame during loading and unloading and when the vehicle is in transit and means for operating the brake shoes simultaneously.

3. A vehicle for collecting containers embodying a pair of standards fixed to the vehicle, wheel members supported from said standards and rotatably mounted relatively thereto, a plurality of radial arms to each wheel member, extensions on said arms, trays longitudinally disposed relatively to the vehicle and pivotally suspended from said arms, manually operable means for rotating the said wheel members so as to bring each tray successively into a loading and unloading position, friction discs carried by each of said trays, brake shoes adapted to co-operate with each of said discs, manually operable means for moving the brake shoes simultaneously into or out of engagement with the friction discs, the brake shoes when in frictional engagement with the discs preventing swinging of the trays relatively to the wheel members during loading and unloading and when the vehicle is in transit and means for facilitating the loading and unloading of the trays.

RAYMOND GUY PALMER.